March 9, 1965 W. E. BROWN 3,173,038

DIODE HEAT SINK MOUNTING FOR DYNAMOELECTRIC MACHINES

Filed Aug. 30, 1961 3 Sheets-Sheet 1

INVENTOR.
William E. Brown
BY C. R. Meland
His Attorney

March 9, 1965 W. E. BROWN 3,173,038

DIODE HEAT SINK MOUNTING FOR DYNAMOELECTRIC MACHINES

Filed Aug. 30, 1961 3 Sheets-Sheet 2

INVENTOR.
William E. Brown
BY C. R. Meland
His Attorney

DIODE HEAT SINK MOUNTING FOR DYNAMOELECTRIC MACHINES

INVENTOR.
William E. Brown
BY C. R. Meland
His Attorney 3,173,038

DIODE HEAT SINK MOUNTING FOR DYNAMOELECTRIC MACHINES

William E. Brown, Anderson, Ind., assignor to General Motors Corporation, Detroit, Mich., a corporation of Delaware Filed Aug. 30, 1961, Ser. No. 134,920
8 Claims. (Cl. 310—68)

This invention relates to dynamoelectric machines that have built-in diodes and more particularly to a resilient mounting for a heat sink member that carries the diodes.

One of the objects of this invention is to provide a dynamoelectric machine such as an alternating current generator with diodes for rectifying the A.C. output of the generator to direct current, the diodes being mounted in a heat sink member that is supported by an end frame of the generator and further wherein resilient means are provided for reducing vibration of the heat sink member and diodes.

Another object of this invention is to provide an end frame assembly for a dynamoelectric machine that includes a heat sink member that carries a plurality of semiconductor diodes, the heat sink member being secured to the end frame with the ends of the heat sink member contacting resilient vibration dampening means.

Still another object of this invention is to provide an end frame assembly for a dynamoelectric machine wherein the end frame assembly carries a metal heat sink member that supports a plurality of semiconductor diodes, the ends of the heat sink member contacting resilient vibration dampening means that fit within U-shaped troughs or channels formed in the end frame.

Further objects and advantages of the present invention will be apparent from the following description, reference being had to the accompanying drawings wherein preferred embodiments of the present invention are clearly shown.

Figure 1:
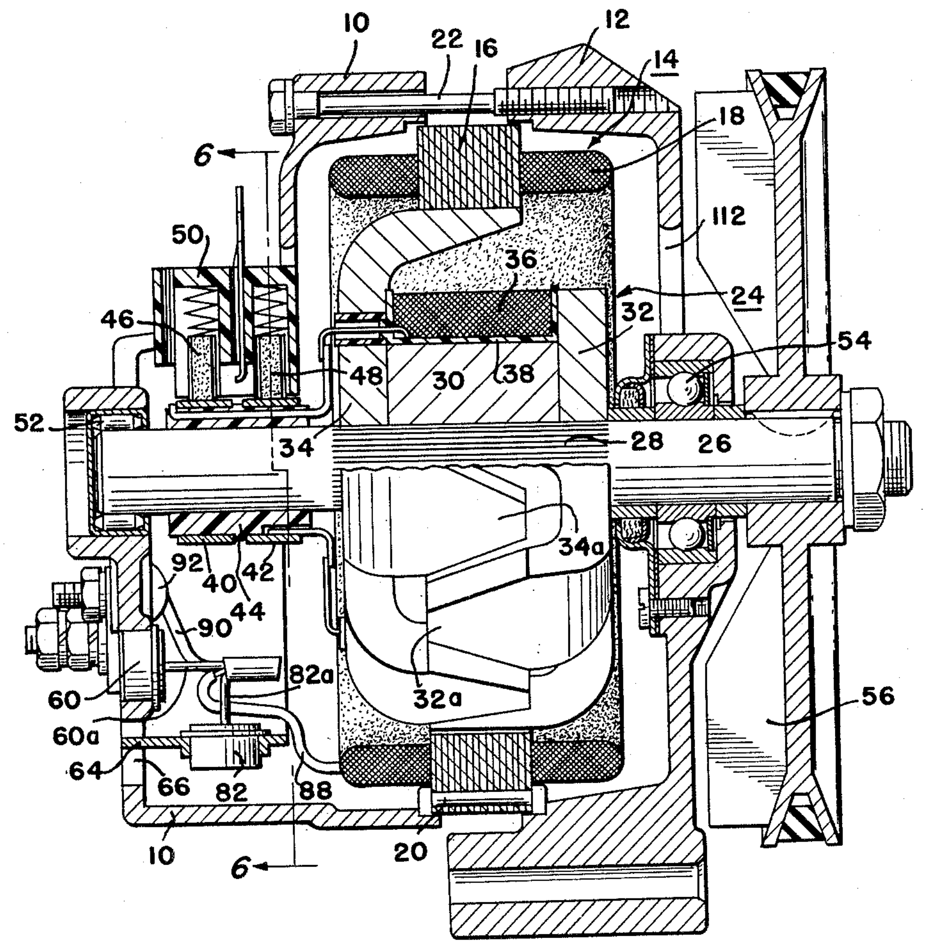
FIGURE 1 is a sectional view of a dynamoelectric machine made in accordance with this invention, and taken along line 1—1 of FIGURE 2.

Referring now to the drawings and more particularly to FIGURE 1, the reference numerals 10 and 12 designate the end frames of an alternating current generator made in accordance with this invention. These end frames 10 and 12 are formed of a suitable metal material such as die cast aluminum. The end frames 10 and 12 support a stator assembly which is generally designated by reference numeral 14. The stator assembly includes a stack of steel laminations 16 having slots which receive a three-phase Y-connected stator winding 18. The stator laminations 16 are held together by rivets 20 and it is seen that the ends or heads of the rivets 20 are contacted by the end frames 10 and 12. The end frames 10 and 12 clamp the stator assembly and are held together by the bolts 22 which are threaded into the end frame 12.

The rotor for the alternator of FIGURE 1 is generally designated by reference numeral 24. This rotor includes a shaft 26 having a splined section 28. Fitted to the splined section 28 is a core member 30 formed of magnetic material and pole members 32 and 34 likewise formed of magnetic material. The pole member 32 has axially extending fingers 32a which interleave with the axially extending fingers 34a of the pole member 34.

A field coil winding 36 is wound on an insulating spool 38 and this spool is supported by the core member 30 and positioned between the pole members 32 and 34. The lead wires for the field coil 36 are connected with slip rings 40 and 42 which are supported by an annular insulating member 44. The insulator member 44 is press-fitted to the shaft 26 and rotates therewith. The slip rings 40 and 42 contact brushes 46 and 48 which are mounted in a brushholder 50 that is formed of electric insulating material. The brushes 46 and 48 and the slip rings 40 and 42 provide means for supplying direct current to the field winding 36.

The shaft 26 is journalled in bearings 52 and 54 located respectively in the end frames 10 and 12. A combined pulley and fan 56 is secured to the shaft 26 and this pulley may be belt driven by an internal combustion engine or other power source.

The alternating current generator of this invention is provided with built-in diodes which are connected with the three-phase stator winding 18 and in a three-phase full wave bridge rectifier network. To this end, the end wall of the end frame 10 is formed with three circular openings that receive the diodes 58, 60 and 62. These diodes are of the PN junction semiconductor type and are preferably of the silicon type. Each diode has an outer metal case which is press fitted in a respective opening in the end frame 10 and which forms one electrical side of the diode. The opposite electrical side of the diode takes the form of projecting terminals 58a, 60a and 62a.

Figures 2, 3, 4, 5:
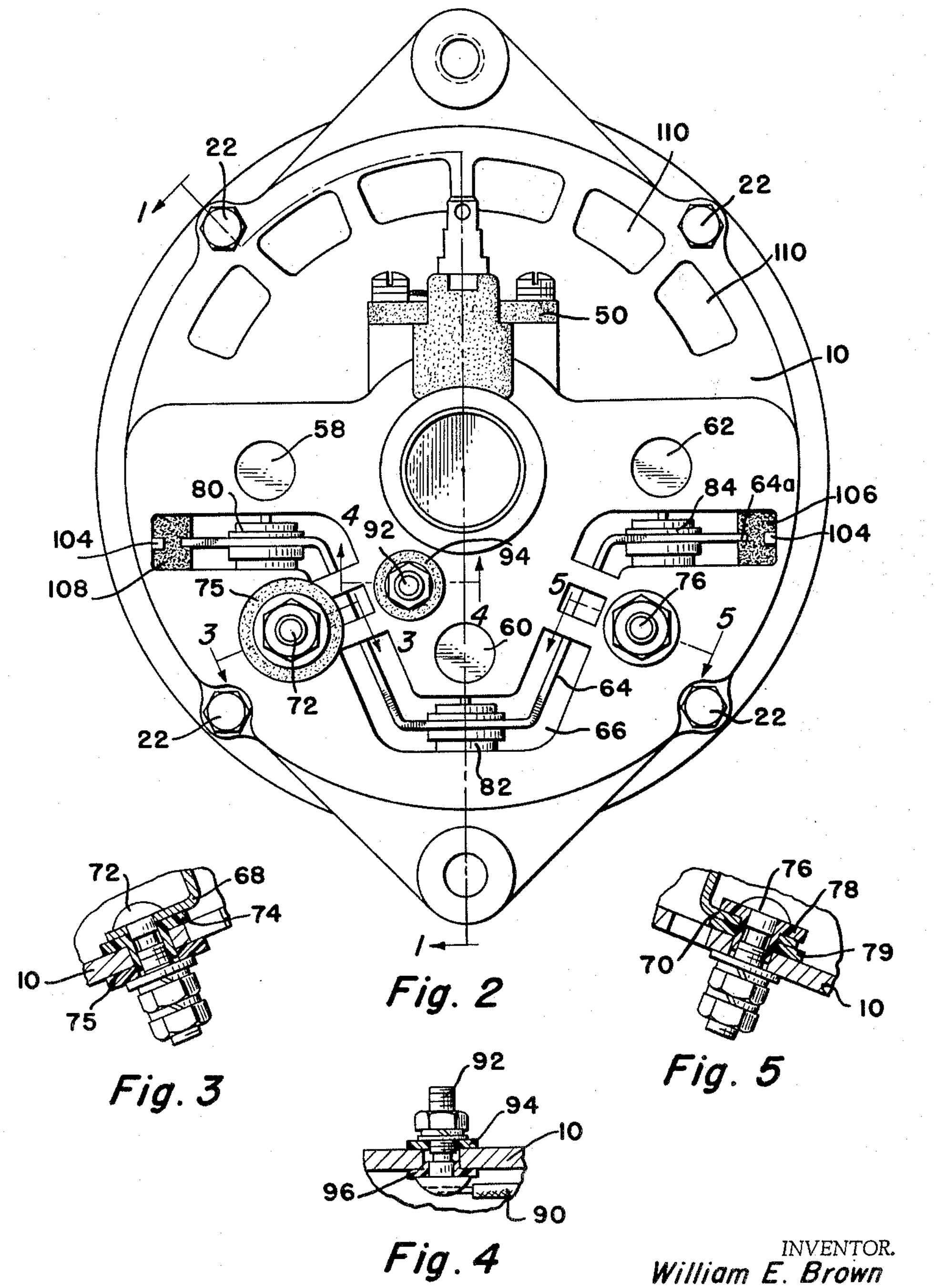
FIGURE 2 is an end view of a dynamoelectric machine made in accordance with this invention.
FIGURE 3 is a sectional view taken along line 3—3 of FIGURE 2.
FIGURE 4 is a sectional view taken along line 4—4 of FIGURE 2.
FIGURE 5 is a sectional view taken along line 5—5 of FIGURE 2.

The end frame 10 carries a metal heat sink member 64 which is formed of sheet aluminum material or cast aluminum material. It is seen that this heat sink member 64 is generally U-shaped and is positioned in direct alignment with a U-shaped slot 66 formed in the end wall of the end frame 10. The heat sink member 64 has mounting flanges 68 and 70. A terminal stud 72 is provided which passes through an opening formed in the mounting flange 68 and also passes through an opening formed in the end frame 10. This terminal stud 72 is best illustrated in the sectional view of FIGURE 3 and it is seen that the terminal stud and mounting flange 68 are insulated from the end frame 10 by insulator washers 74 and 75. The terminal stud 72 has a threaded section which receives a pair of nuts, as is clearly apparent from FIGURE 3.

Another terminal stud 76 is provided and this terminal stud passes through the mounting flange 70 and through an opening formed in the end frame 10. The terminal stud 76 is insulated from the mounting flange 70 by an insulator washer 78. The end frame 10 and mounting flange 70 are insulated from each other by insulating washer 79. The terminal stud 76 like terminal stud 72 has a threaded section which receives nuts for securing a lead wire to the terminal stud.

The terminal studs 72 and 74 perform the function of securing the heat sink 64 to the end frame and also serve to electrically connect the heat sink and end frame to points exterior of the generator. Thus, terminal stud 72 is electrically connected with heat sink 64 but is insulated from end frame 10. On the other hand, the terminal stud 76 is insulated from the heat sink 64 but is electrically connected with the end frame 10.

The heat sink member 64 is provided with three circular openings which respectively receive the semiconductor diodes 80, 82 and 84. The diodes 80, 82 and 84 are the same as diodes 58, 60 and 62 in that they each have an outer metal case and projecting terminals. The diodes 80, 82 and 84 are of an opposite conductivity type as compared to diodes 58, 60 and 62. Thus, the metal cases of diodes 80, 82 and 84 will have an opposite electric polarity as compared to the metal cases of diodes 58, 60 and 62.

The projecting terminal 80a of diode 80 is connected with the projecting terminal 58a of diode 58 and both of these terminals are electrically connected with one of the phase windings of stator winding 18 via the lead wire 86. In a similar fashion, the projecting terminal 82a of diode 82 is connected with the projecting terminal 60a of diode 60 and both of these terminals are connected with another phase winding of stator winding 18 via lead wire 88. In addition, the terminals 60a and 82a and the lead wire 88 are connected with a lead wire 90. The lead wire 90 is connected with a terminal stud 92 which passes through the end frame 10 and which is electrically insulated from the end frame by insulator washers 94 and 96. The projecting terminal 84a of diode 84 is connected with the projecting terminal 62a of diode 62 and both of these terminals are connected with the third phase winding of stator winding 18 via the lead wire 98.

It will be appreciated from the foregoing that the diodes form a three-phase full wave bridge rectifier network that is connected with the three-phase stator winding 18. The heat sink 64 and stud 72 will form one of the D.C. output terminals of the bridge rectifier whereas the end frame 10 and stud 76 form the other direct current output terminal.

Figure 6:
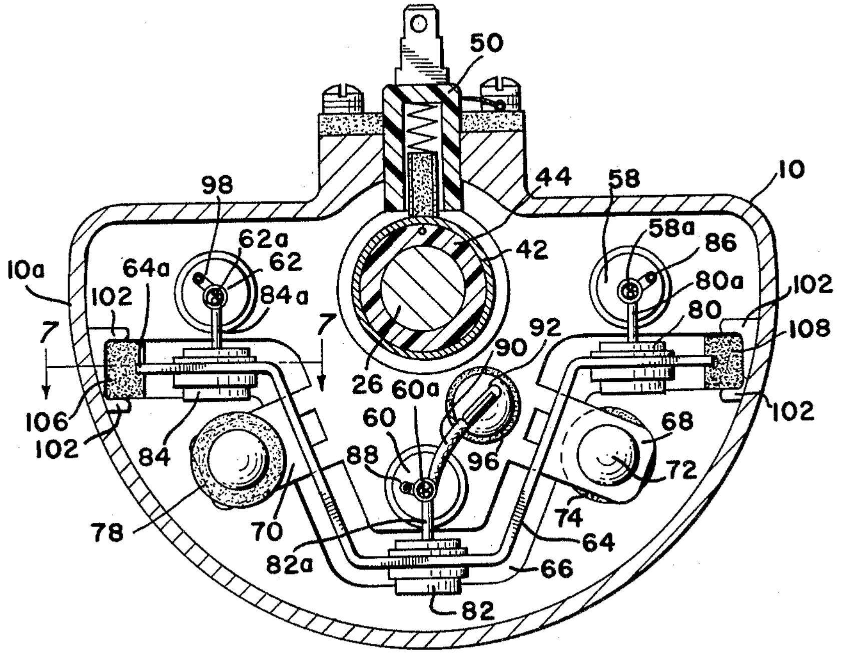
FIGURE 6 is a sectional view taken along line 6—6 of FIGURE 1.
Figure 7:
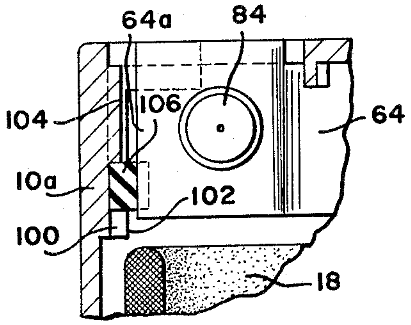
FIGURE 7 is a sectional view taken along line 7—7 of FIGURE 6.

Referring now more particularly to FIGURES 6 and 7, the axially extending wall 10a of the end frame 10 is formed with a U-shaped trough or channel 100 which is defined by a pair of integral spaced ribs 102, only one of which is illustrated in FIGURE 7. The other rib is located above the rib illustrated in FIGURE 2 and these two ribs form the U-shaped area or trough 100. A third integral rib 104 is provided which is located intermediate the ribs 102 but only extends part way the length of the ribs 102.

Fitted within the U-shaped trough or channel 100 is a vibration dampening member 106 formed of a resilient material such as rubber. The rubber member 106 has a slot which receives the edge 64a of the heat sink member 64. This rubber member 106 engages the end of the rib 104 and is positioned between the ribs 102. A second vibration dampener member 108 is provided which is identical with the vibration dampener 106 and which fits between ribs in a manner identical with that illustrated in FIGURE 7. The rubber members 106 and 108 thus engage the ends of the heat sink member 64 and are supported by the axially extending wall 10a of end frame 10. These rubber members serve to dampen vibration of the heat sink member 64 to prevent fracturing of the heat sink member and prevent vibration of the diodes carried by the heat sink member.

When the field winding 36 is supplied with direct current, for example, from the D.C. output terminals of the built-in diodes and through a suitable voltage regulating means, and when the rotor assembly is rotating an alternating current is induced in stator winding. The alternating current which is generated in stator winding 18 is rectified by the built-in diodes and direct current is taken from terminal studs 72 and 76. During operation of the alternator, the rubber members 106 and 108 serve to dampen vibration of the heat sink 64 and thus serve to protect the heat sink and the diodes.

As the rotor is rotating, the fan 56 draws air through the U-shaped air inlet opening 66 and through openings 110 formed in the end frame 10. The air is exhausted from the dynamoelectric machine through air outlet openings 112 formed in the end frame 12. The air in passing between the inlet openings and the outlet openings serves to cool the diodes, the field winding and the stator winding.

While the embodiments of the present invention as herein disclosed constitute preferred forms, it is to be understood that other forms might be adopted.

What is claimed is as follows:

1. An end frame assembly for a dynamoelectric machine comprising, a metal end frame, a metal heat sink member having opposite ends carrying a diode, fastener means securing said heat sink member to one wall of said end frame at a point intermediate the opposite ends of said metal heat sink member, and a vibration dampening means engaging each end of said metal heat sink member and engaging a wall of said end frame.

2. An end frame assembly for a dynamoelectric machine comprising, a metal end frame, said metal end fare having an end wall and an axially extending wall, a metal heat sink member having opposite ends carrying a plurality of semiconductor diodes, fastener means securing said heat sink member to said end wall of said end frame at a point intermediate said opposite ends of said metal heat sink member, and a resilient means interposed between each end of said metal heat sink member and said axially extending wall.

3. An end frame assembly for a dynamoelectric machine comprising, a metal end frame having an end wall and an axially extending wall, a metal heat sink member having opposite ends carrying at least one diode, fastener means securing said metal heat sink member to said end wall at a point intermediate said opposite ends of said metal heat sink member, rib means in said axially extending wall forming a pair of generally U-shaped troughs, and a resilient means positioned within each of said U-shaped troughs and engaging the ends of said metal heat sink member.

4. An end frame assembly for a dynamoelectric machine comprising, a metal end frame, said metal end frame having an end wall and an axially extending wall, a metal heat sink member supported intermediate its ends from said end wall and extending between spaced portions of said axially extending wall, said metal heat sink member having a plurality of openings, semiconductor diodes positioned in said openings, and resilient vibration dampening means interposed between each of said portions of said axially extending wall and a respective end of said metal heat sink member.

5. An end frame assembly for a dynamoelectric machine comprising, a metal end frame having an end wall and an axially extending wall, an elongated metal heat sink member extending across said end frame having free ends spaced from portions of said axially extending wall, means securing said heat sink member to said end frame at a point intermediate its free ends, and resilient means interposed respectively between said free ends of said heat sink member and said axially extending wall.

6. In combination, an alternating current generator having first and second metal end frames, an output winding for said generator, a metal heat sink member located within said first end frame, a first group of semiconductor diodes supported by said metal heat sink member, a second group of semiconductor diodes supported by said end frame, means electrically connecting said groups of diodes with said output winding and with each other in a three phase full wave bridge rectifier network, fastener means for supporting said metal heat sink member from said first end frame located intermediate the ends of said metal heat sink member, resilient vibration dampening means interposed between said metal heat sink member and said first end frame and located outwardly of said fastener means, air inlet openings formed in said first end frame, air outlet openings formed in said second end frame, and a fan driven by said generator positioned outside of said second end frame for drawing air through said generator and past said diodes.

7. In combination, an alternating current generator having a metal end frame and an output winding, said generator having a rotor supported by a shaft one end of which passes through said end frame, said one end of said shaft carrying slip rings which are electrically connected with a field winding that forms a part of said rotor, a brushholder carrying brushes which are engageable with said slip rings, said brushholder being disposed on one side of said shaft, a metal heat sink member disposed on an opposite side of said shaft, said metal heat sink member supporting at least one diode, means securing said metal heat sink member to said metal end frame, means electrically connecting said output winding with said diode, and resilient means interposed between said metal heat sink member and said end frame operating as a vibration dampening means for said metal heat sink member.

8. In combination, an alternating current generator having a first end frame and a second end frame, a stator assembly supported by said end frames having a three phase output winding, a rotor member including a field winding supported by a shaft that is journalled for rotation in said end frames, said shaft extending through said first end frame and carrying slip rings which are electrically connected with said field winding, a brushholder disposed on one side of said shaft carrying brushes which are engageable with said slip rings, a metal heat sink member disposed on an opposite side of said shaft, a first group of diodes supported by said metal heat sink member, a second group of diodes supported by said first end frame, means electrically connecting said diodes with said three phase output winding and with each other in a three phase full wave bridge rectifier network, means located between the ends of said metal heat sink member for securing said metal heat sink member to said first end frame, and resilient vibration dampening means disposed respectively between the ends of said metal heat sink member and said first end frame.

References Cited by the Examiner

UNITED STATES PATENTS 3,001,121 9/61 Kerr -------------------- 321—8

MILTON O. HIRSHFIELD, *Primary Examiner.*